United States Patent [19]

Bowling

[11] 4,426,166

[45] Jan. 17, 1984

[54] MODULAR PRINTER WITH CODED PLUG COMPATIBLE MODULES

[75] Inventor: Stephen R. Bowling, Los Altos Hills, Calif.

[73] Assignee: Qume Corporation, San Jose, Calif.

[21] Appl. No.: 434,289

[22] Filed: Oct. 14, 1982

[51] Int. Cl.³ .............................. B41J 5/30; B41J 1/60; H03K 13/34

[52] U.S. Cl. .............................. 400/62; 340/347 DD; 364/519

[58] Field of Search ........................... 400/144, 62, 67; 340/347 DD; 364/519

[56] References Cited

U.S. PATENT DOCUMENTS

| | | | |
|---|---|---|---|
| 3,713,138 | 1/1973 | Girard | 340/347 DD |
| 3,833,887 | 9/1974 | Shevlin | 400/62 X |
| 3,860,908 | 1/1975 | Stratton | 340/347 DD |
| 4,006,463 | 2/1977 | Hanks | 400/62 X |
| 4,068,227 | 1/1978 | Graham | 340/347 DD |
| 4,086,580 | 4/1978 | Schroeder | 340/347 P |
| 4,103,766 | 8/1978 | Ruble et al. | 400/62 |
| 4,381,553 | 4/1983 | Ferguson | 364/519 X |

FOREIGN PATENT DOCUMENTS 972684  8/1975  Canada .......................... 340/347 DD

OTHER PUBLICATIONS

"Smartinterface Adds Control Function to Daisy--Wheel Printers", Electronics Review, vol. 28, No. 10, 1980, 41-42.
"Microprocessor Controlled Printer System Emulates Dec-20 Controller", Computer Design, Sep. 1980, vol. 19, No. 9, p. 68.

Primary Examiner—E. H. Eickholt
Attorney, Agent, or Firm—T. E. Kristofferson; A. D. Stolzy

[57] ABSTRACT

A daisywheel printer having interchangeable modules for different respective communications with alternate corresponding plug-in connections.

9 Claims, 5 Drawing Figures

MODULAR PRINTER WITH CODED PLUG COMPATIBLE MODULES

BACKGROUND OF THE INVENTION

This invention relates to a daisywheel printers or the like, and more particularly to a printer having a plurality of plug-in modules for different respective communications.

PRIOR ART STATEMENT

In the past, a typical printer/terminal consisted of all electronics packaged internally, i.e., in one housing. The communications electronics were closely integrated internally with the said other internal printer electronics. It was then very difficult to separate the communications.

The type of communications required has been diverse. Typical of the requirements are: RS232, Centronics, IEEE, Data I/O, Std, Specials, etc. The lack of separation of the communications from the balance of the printer provides sales and the end user with little flexibility.

SUMMARY OF THE INVENTION

In accordance with the printer of the present invention, the above-described and other disadvantages of the prior art are overcome by providing a pluggable communications module that is easily installed into the printer/terminal. The communications module preferably is a separate package and the basic printer/terminal preferably contains the mechanical and electrical interfaces to accept the module.

Advantages:
  The present invention is highly desirable for use in connection with the distributor/direct sales market;
  The present invention helps in reducing inventory levels, dealer stocks, basic printers and communication modules. Thus, a different type of printer is not needed for each communication system;
  The present invention provides quick configuration-/feature changes via the pluggable communications module.

Typical of the prior art is a daisywheel printer sold by the Qume Corporation under the trademark "Sprint 11."

See also U.S. Pat. No. 4,118,129 issued Oct. 3, 1978.

BRIEF DESCRIPTION OF THE DRAWINGS

In the accompanying drawings which illustrate exemplary embodiments of the present invention.

DESCRIPTION OF THE PREFERRED EMBODIMENTS

Figure 1:
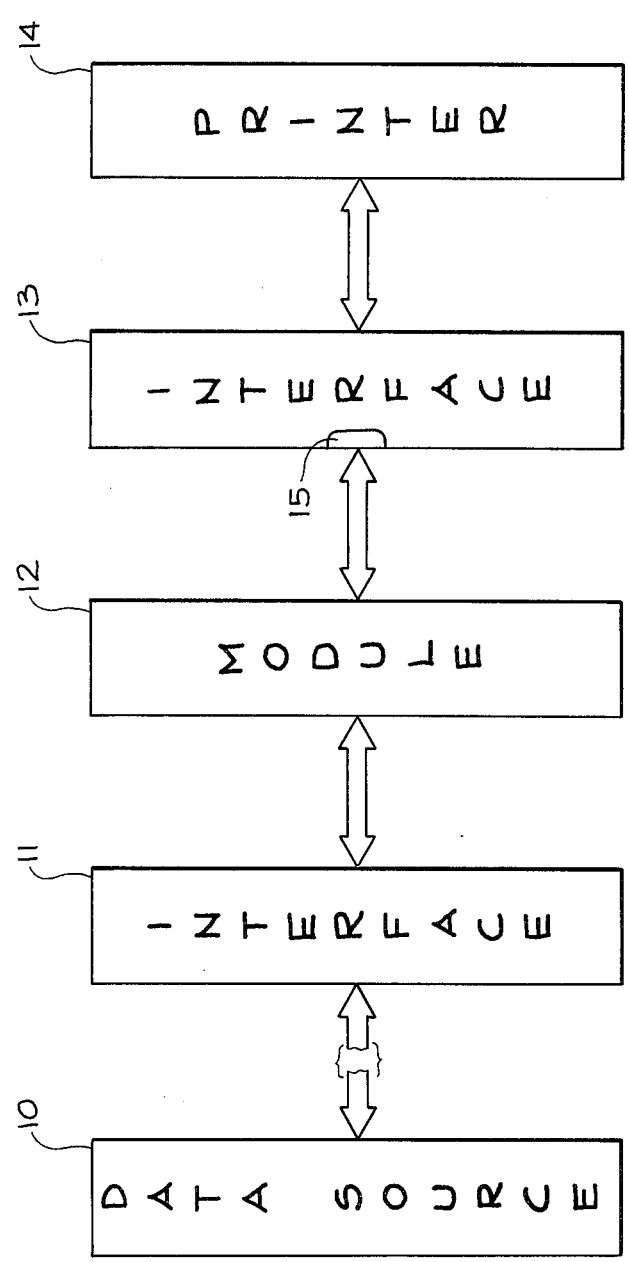
FIG. 1 is a block diagram of one embodiment of the present invention.

In the drawings in FIG. 1, a conventional data source 10 is connected to a conventional communications interface 11 from a location in proximity thereto or from a remote location. Data source 10 supplies input signals to communications interface 11 in one electrical pulse code such as one of the conventional codes, RS232C, Centronics and IEEE.

A module 12 is connected with communications interface 11 and a printer interface 13. A printer 14 is connected from interface 13. Interface 11 may be a shared interface. Interface 13 may also be a shared interface.

Module 12 is tailored to data source 10 and/or communications interface 11 and is adapted to accommodate the particular code appearing at the output of data source 10.

Module 12 is connected to printer interface 13 via a conventional quick detachable electrical connector 15. Thus it is possible to connect any one of a plurality of modules corresponding to plural different respective conventional codes. Each such module may have, for example, a plug of an electric connector to mate with, for example, the self-same socket in printer interface 13. It is therefore possible for the system of FIG. 1 to operate and printer 14 to print according to the data supplied via any selected one of the said conventional codes. Furthermore, a first module corresponding to a first code can be unplugged from printer interface 13, and a second module corresponding to a second code different from the said first code can be substituted therefor. Printer 14, although unchanged, will then print according to data received via a first code with a first code module plugged in or data received via a second code with a second code module plugged in.

Module 12 may, at least in part, be conventional. It, without the connection therefrom, may be found in the printer housing of a printer sold under the trademark "Sprint 11" owned by the Qume Corporation of San Jose, Calif.

Figure 2:
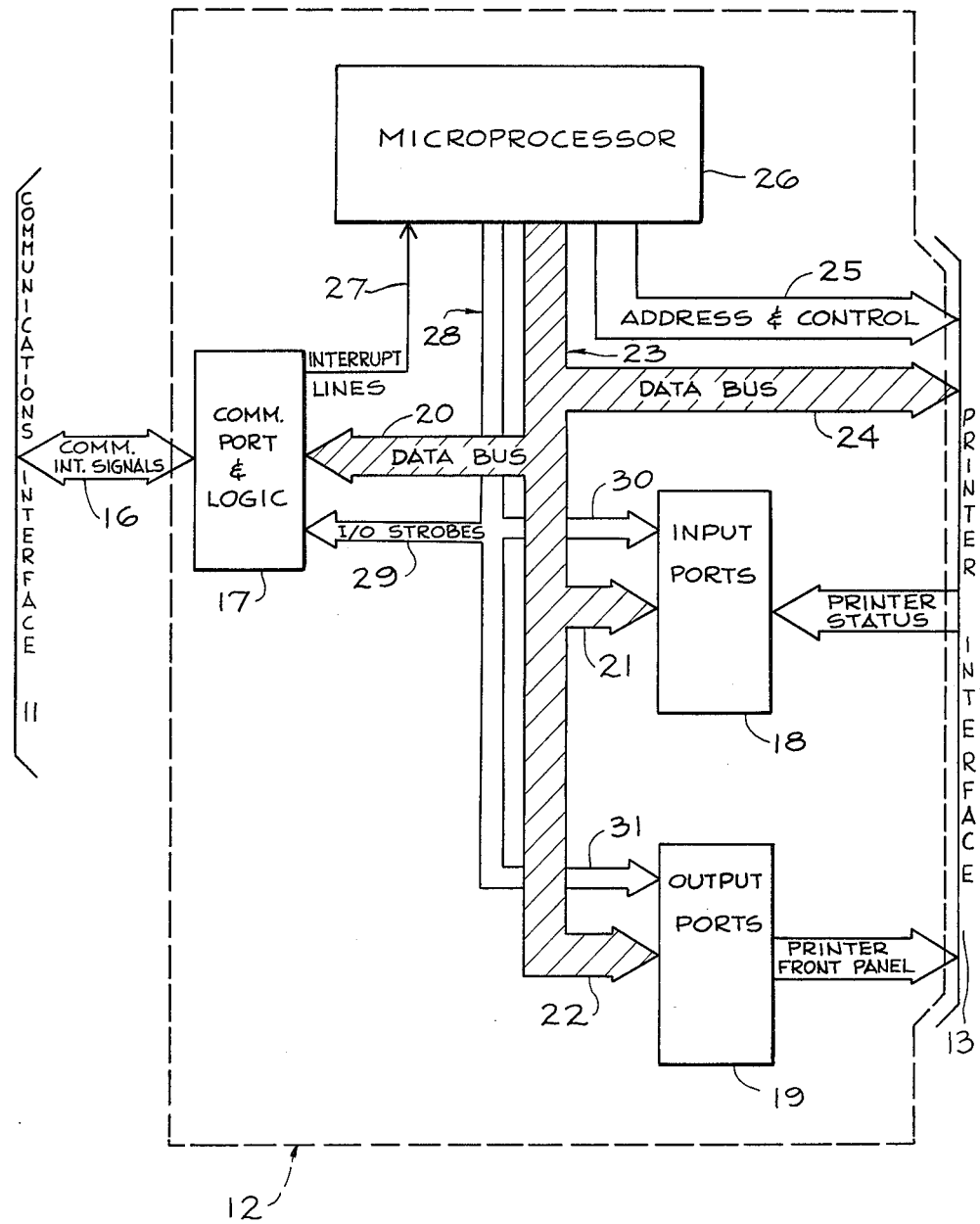
FIG. 2 is a more detailed block diagram of a module shown in FIG. 1.

A more detailed block diagram of module 12 is shown in FIG. 2. Communications interface signals are sent at 16 between communications interface 11 and module 12. The same are sent by and received by communications port and logic 17. Input and output ports are respectively provided at 18 and 19. Communications port and logic 17, and input and output ports 18 and 19 all receive inputs 20, 21 and 22 from a data bus 23 that is connected from a microprocessor 26 and also has a connection 24 with printer interface 13. The same is true of an address and control connection 25.

Interrupt lines 27 are connected from communications port and logic 17 to microprocessor 26.

Input/output strobe connections are provided from microprocessor 26 at 28 to communications port and logic 17 and input and output ports 18 and 19 via 29, 30 and 31, respectively.

Figure 3:
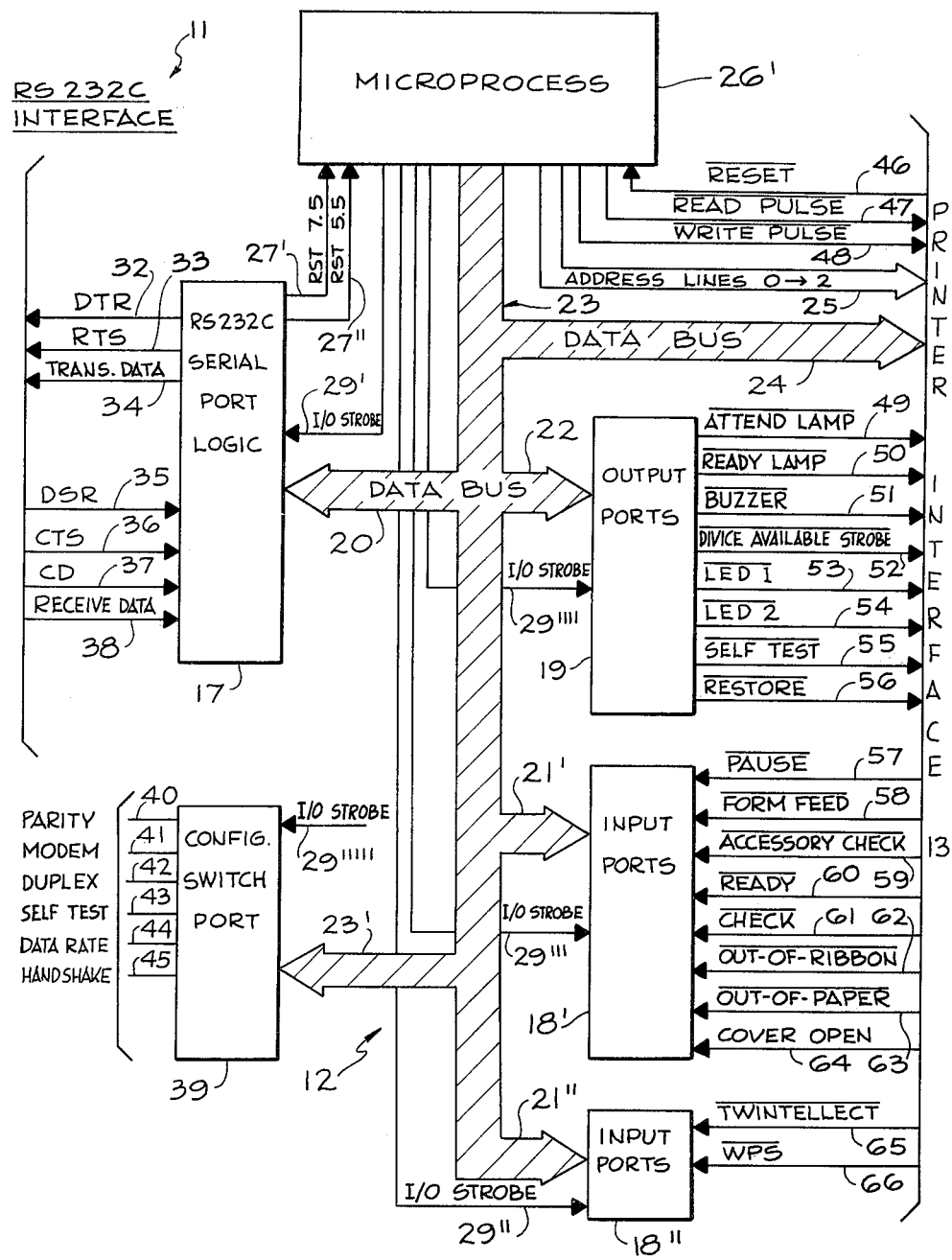
FIGS. 3, 4 and 5 are block diagrams of respective second, third and fourth alternative embodiments of the module of the present invention.

In FIG. 3, module 12 is shown in detail greater than that in which it is shown in either one of FIG. 1 or 2.

In the specific embodiment of FIG. 3, communications interface 11 with data source 10, and module 12 are all constructed to generate or receive appropriate signals in the RS232C code.

Logic 17 impresses signals DTR, RTS and TRANS. DATA on leads 32, 33 and 34, respectively, to interface 11.

Logic 17 has inputs 35, 36, 37 and 38 from interface 11 bearing signals DSR, CTS, CD and RECEIVE DATA.

I/O strobes 29', 29'', 29''', 29'''', 29''''' are equivalent to 29, 30 and 31 in FIG. 2. Interrupt lines 27' and 27'' in FIG. 3 are equivalent to 27 in FIG. 2.

A configuration switch port 39 has a data bus input 23'. Input ports 18' and 18'' and inputs 21' and 21'' are respectively equivalent to input port 18 and input 21 in FIG. 2.

In FIG. 3, signals are switch selectable at the module as follows:

| Lead | Signal |
|---|---|
| 40 | PARITY |
| 41 | MODEM |
| 42 | DUPLEX |
| 43 | SELF TEST |
| 44 | DATA RATE |
| 45 | HANDSHAKE |

Microprocessor 26, output ports 19 and input ports 18' and 18" have interface connecting leads carrying respective signals as follows:

| Lead | Signal |
|---|---|
| 46 | RESET |
| 47 | READ PULSE |
| 48 | WRITE PULSE |
| 49 | ATTEND LAMP |
| 50 | READY LAMP |
| 51 | BUZZER |
| 52 | DEVICE AVAILABLE STROBE |
| 53 | LED 1 |
| 54 | LED 2 |
| 55 | SELF TEST |
| 56 | RESTORE |
| 57 | PAUSE |
| 58 | FORM FEED |
| 59 | ACCESSORY CHECK |
| 60 | READY |
| 61 | CHECK |
| 62 | OUT-OF-RIBBON |
| 63 | OUT-OF-PAPER |
| 64 | COVER OPEN |
| 65 | TWINTELLECT |
| 66 | WPS |

Figure 4:
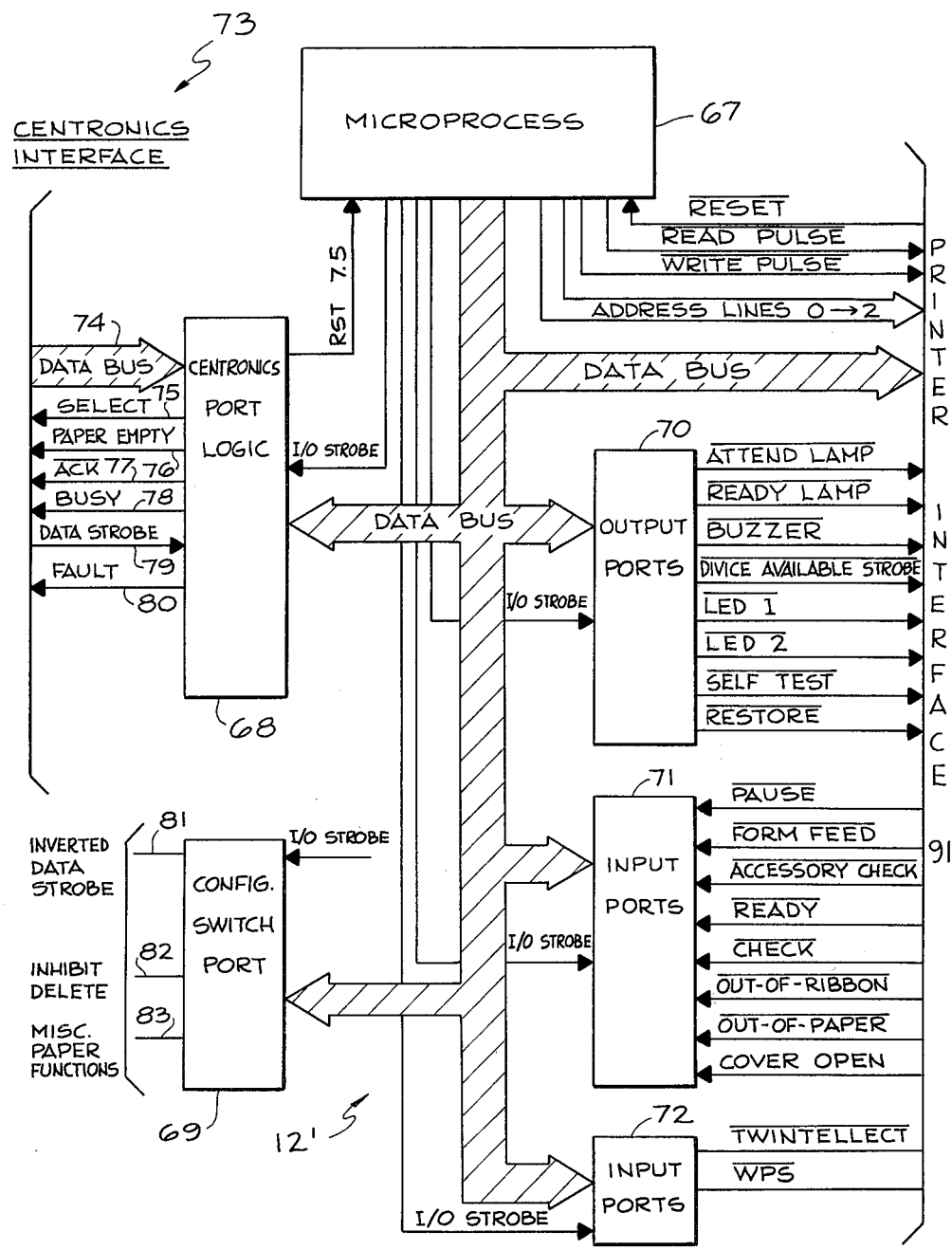
Figure 5:
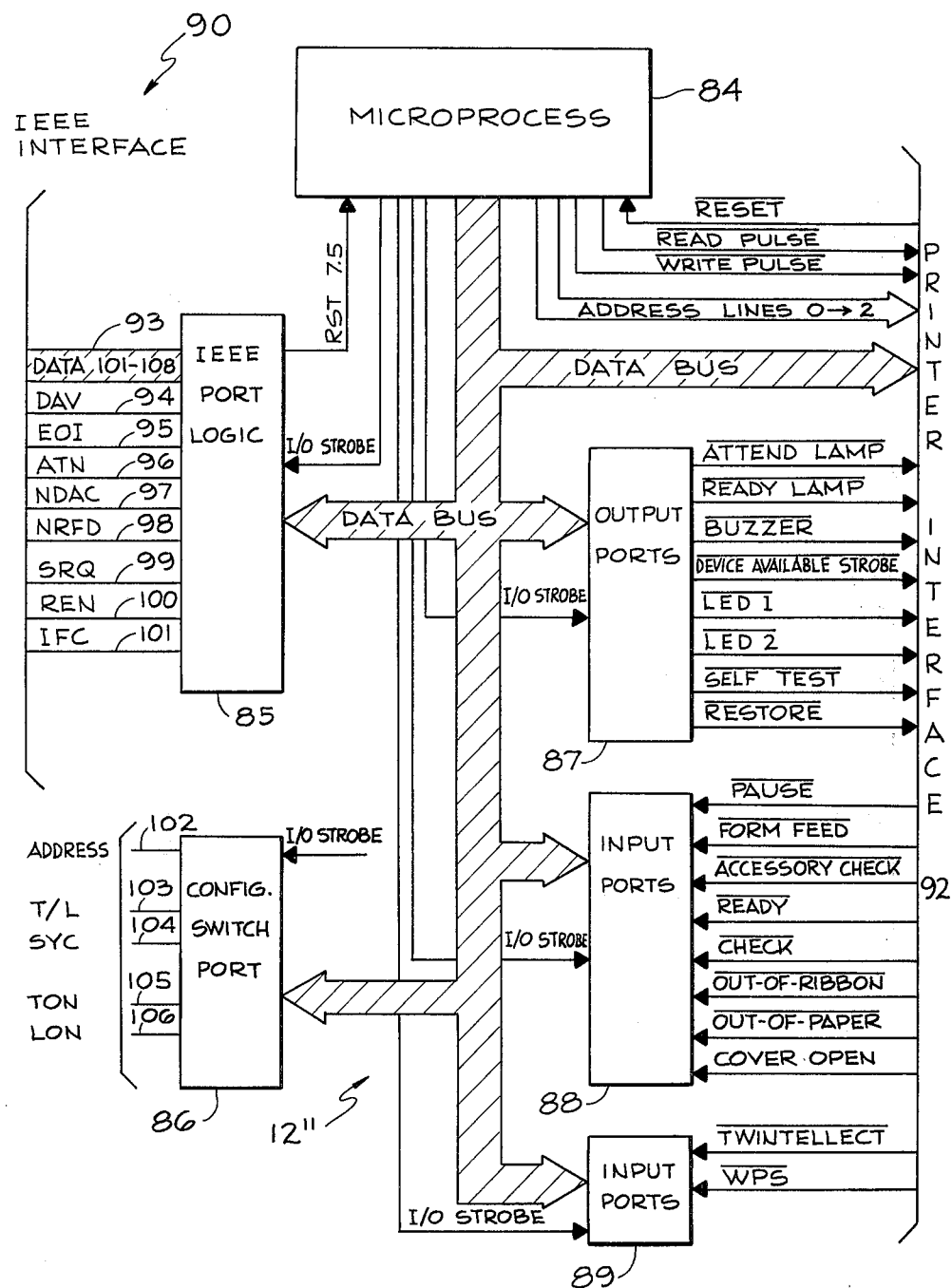

FIGS. 4 and 5 disclose modules 12' and 12" for use with Centronics and IEEE communications, respectively. In FIGS. 3, 4 and 5, the respective printer interfaces 13, 91 and 92 are identical and are the same said "Byte II" interface. Furthermore, all the connections to and from the printer interfaces in FIGS. 3, 4 and 5 are identical and will not be described further herein.

In FIG. 4, microprocessor 67, Centronics port logic 68, configuration switch port 69, and input and output ports 70, 71 and 72 respectively correspond to 26, 17, 39, 19, 18' and 18" in FIG. 3.

In FIG. 4, module 12' and interface 73 are constructed according to the conventional Centronics communications code.

In FIG. 4, leads and respective signals between logic 68 and port 69, and interface 73 are as follows:

| Lead | Signal |
|---|---|
| 74 | DATA BUS |
| 75 | SELECT |
| 76 | PAPER EMPTY |
| 77 | ACK |
| 78 | BUSY |
| 79 | DATA STROBE |

In FIG. 4, signals are selectable switch options as follows:

| Lead | Signal |
|---|---|
| 80 | FAULT |
| 81 | INVERTED DATA STROBE |
| 82 | INHIBIT DELETE |
| 83 | MISC. PAPER FUNCTIONS |

In FIGS. 3, 4 and 5 note will be taken that identical mutual connections are illustrated between microprocessors 26, 67 and 84, logic 17, 68 and 85, ports 39, 69 and 86, ports 19, 18', 18", 70, 71, 72, 87, 88 and 89.

In FIG. 5, microprocessor 84, logic 85, port 86, ports 87, 88 and 89 correspond to 26, 17, 39, 19, 18' and 18" in FIG. 3.

In FIG. 5, module 12" and interface 90 are constructed according to the conventional IEEE communications.

In FIG. 5, the leads and signals between logic 85 and port 86, and interface 90 are as follows:

| Lead | Signal |
|---|---|
| 93 | DATA 101-108 |
| 94 | DAV |
| 95 | EOI |
| 96 | ATN |
| 97 | NDAC |
| 98 | NRFD |
| 99 | SRQ |
| 100 | REN |
| 101 | IFC |

In FIG. 5, signals are selectable switch options as follows:

| Lead | Signal |
|---|---|
| 102 | ADDRESS |
| 103 | T/L |
| 104 | SYC |
| 105 | TON |
| 106 | LON |

Microprocessors 26, 67 or 84 each, alternatively, may be a random logic system, if desired (8085, ROM, RAM, TIMING).

What is claimed is:

1. A system for making a written record of data received in any selected one of a plurality of communications codes, said system comprising: a communications interface constructed in accordance with one communications code; a printer interface; a printer connected from said printer interface; and one module corresponding to said one code and movable independently of said printer interface, said module being connected between said interface to convert said one code to a set of signals to operate said printer, said module and said printer interface having mating portions of a quick detachable electrical connector such that said module may be connected to said printer interface or replaced by another module with a mating connector and corresponding to another communications code.

2. The invention as defined in claim 1, wherein a data source is connected to said communications interface to deliver the self-same one code thereto to which said one module corresponds.

3. The invention as defined in claim 2, wherein said one code is the conventional RS232C code and said other code is the conventional Centronics code.

4. The invention as defined in claim 2, wherein said one code is the conventional RS232C code and said other code is the conventional IEEE code.

5. The invention as defined in claim 2, wherein said one code is the conventional Centronics code and said other code is the conventional IEEE code.

6. A system for making a written record of data received in any selected one of a plurality of communications codes, said system comprising: at least first and second sources for producing data signals in first and second different respective communications codes; first and second communications interfaces connected respectively from said first and second sources and correspondingly respectively to said first and second codes; first and second modules respectively connected from said first and second communications interfaces, said first module being constructed to produce a set of output signals the same as that of said second module; a printer interface; and a printer connected from said printer interface, said printer interface including an electrical socket, said first and second modules having first and second plugs, each of said plugs being constructed to mate with the self-same said socket, said first and second modules being alternately connectible with said printer interface to convert said first and second codes, respectively, and alternately to the same set of signals to operate said printer.

7. The invention as defined in claim 6, wherein said first code is the conventional RS232C code and said second code is the conventional Centronics code.

8. The invention as defined in claim 6, wherein said first code is the conventional RS232C code and said second code is the conventional IEEE code.

9. The invention as defined in claim 6, wherein said first code is the conventional Centronics code and said second code is the conventional IEEE code.

* * * * *